United States Patent [19]

Kienberger et al.

[11] Patent Number: 5,949,756
[45] Date of Patent: Sep. 7, 1999

[54] METHOD FOR SWITCHING NARROWBAND LINE BUNDLES BETWEEN COMMUNICATION SYSTEMS VIA AN ATM COMMUNICATION NETWORK

[75] Inventors: Helmut Kienberger; Hans-Peter Mueller, both of Munich, Germany

[73] Assignee: Siemens Aktiengesellschaft, Munich, Germany

[21] Appl. No.: 08/715,891

[22] Filed: Sep. 19, 1996

[30] Foreign Application Priority Data

Sep. 19, 1995 [DE] Germany ............................ 195 34 755

[51] Int. Cl.[6] ............................................ H04L 12/26
[52] U.S. Cl. ......................... 370/232; 370/395; 370/399
[58] Field of Search .................................. 370/229–238, 370/395, 398, 399

[56] References Cited

U.S. PATENT DOCUMENTS 5,101,451  3/1992  Ash et al. ............................. 379/221
5,365,524  11/1994 Hiller et al. ........................... 370/94.2
5,568,544  10/1996 Keeler et al. ........................... 379/273

Primary Examiner—Melvin Marcelo
Attorney, Agent, or Firm—Hill & Simpson

[57] ABSTRACT

Line bundles (LB1 ... 4) containing combined narrowband connections to be switched between time division multiplex communication systems (KS) are converted into a cell-oriented information stream (IS). A predetermined number of the line bundles (LB1, LB2) is switched via permanent virtual connections (PVC1, PVC2) of an ATM communication network (KN). Switched permanent virtual connections (SPVC1, SPVC2) are set up in the ATM communication network (KN) for the switching of additional line bundles (LB3, LB4). The switched permanent virtual connections (SPVC1, SPVC2) are respectively set up and dismantled in dependence on the traffic volume (VB) between the communication systems (KS). The switching-oriented resources of the ATM communication network (KN) are used more efficiently, and the ATM network switching costs are reduced.

19 Claims, 2 Drawing Sheets

METHOD FOR SWITCHING NARROWBAND LINE BUNDLES BETWEEN COMMUNICATION SYSTEMS VIA AN ATM COMMUNICATION NETWORK

BACKGROUND OF THE INVENTION

Current communication systems that switch according to the time division multiplex method, in particular private narrowband telephone switching equipment, are connected with one another via individual narrowband fixed connections or narrowband line bundles. Narrowband connections represent in particular pulse-code modulated (PCM) connections, that is, digitized telephone connections or data connections with a transmission speed of up to 64 kbit/s. Line bundles are formed through multiplexing of the message and signaling information of several narrowband connections, whereby standardized line bundles comprise 32 or 24 narrowband connections or, respectively, channels, and a transmission speed of 2048 kbit/s or 1544 kbit/s. The individual narrowband connections or line bundles provided between the communication systems are switched via fixed connections provided by public or private network operators.

In the future, communication networks operating according to the asynchronous transfer mode (known to those skilled in the art as ATM communication networks) are provided for the switching or, respectively, transmission of the message and signaling information of line bundles in particular. For this purpose, it has been proposed in the relevant standardization committee (ATM Forum) to switch the message and signaling information of line bundles via virtual fixed connections of an ATM communication network. According to this standard "Circuit Emulation Service (CES)," the combined 64 kbit/s message channels, including the signaling channel (that is, the multiplexed channels with a transmission speed of 2048 kbit/s), are transmitted cell by cell via a permanent virtual connections, that is, fixed connection of an ATM communication network. The transmission of the signaling and message information via the ATM communication network ensues transparently, that is, in relation to the standardized protocol layers, the signaling and message information are transmitted transparently according to layers 2 and 3. Since the virtual fixed connections are to be set up administratively, that is, via network management installations through the input of corresponding operation and maintenance instructions, an adaptation to a different number of line bundles to be transmitted, caused by different volumes of traffic within a day or a week, is costly with respect to personnel and time. The size or, respectively, the number of line bundles is hereby to be matched to a peak traffic time, whereby the number of line bundles between the time division multiplex-designed communication systems is determined by this maximum. This means a maximal consumption of resources in the respective ATM communication network, as well as maximum costs for the switching of the line bundles.

SUMMARY OF THE INVENTION

It is an object of the present invention to provide resources of the ATM communication network more efficiently, and thereby to reduce the line bundle switching costs.

An important aspect of the present invention is, for switching of message and signaling information of line bundles, a predetermined number of permanent virtual connections is set up via the ATM communication network between respectively two communication systems. In dependence on the measured traffic volume in the permanent virtual connections set up for the switching of further line bundles, switched permanent virtual connections (that is, via switched connections) are set up via the ATM communication network. They are dismantled again through additional measurements of the traffic volume in the set-up switched permanent virtual connections. The switched permanent virtual connection is again dismantled if no further traffic volume is measured in the switched permanent virtual connections for a predetermined time interval (for example, 10 minutes) . In order to facilitate the automatic connection setup, an address specific to an ATM communication network is predetermined, with which a fixedly configured "hotline destination," that is, the target communication system, is reached. The signaling and message information of the line bundles are transmitted transparently both via the permanent virtual connections and the switched permanent virtual connections. By means of this transparent transmission, in particular of the signaling information, the considerable scope of performance, in particular of private telephone branch exchanges, is maintained. A further advantage of the inventive method is that both the personnel expense for the installation or, respectively, alteration of permanent virtual connections and the switching costs for the line bundles between the respective communication systems are reduced, whereby the ATM communication network resources are used only to the extent respectively required.

According to an advantageous construction of the inventive method, the message and signaling information of time division multiplex-oriented narrowband connections to be switched between communication systems are first allocated to the line bundles that are switched via the installed permanent virtual connections, and message and signaling information, which are to be switched, of additional narrowband connections (in particular at the peak traffic times) are allocated to the line bundles that are switched via switched permanent virtual connections. This measure ensures the most efficient use of the installed virtual fixed connections.

According to an advantageous further development of the inventive method, the traffic volume in the line bundles in the communication systems is continuously measured by means of a line bundle monitoring routine, and the measurement results are transmitted to an external computer-controlled device via an operation and maintenance terminal. By means of an evaluation routine, it is determined when the traffic volume exceeds predetermined values, and a switching-oriented setup information is respectively formed, and, in addition, it is determined when the traffic volume undershoots predetermined values in the line bundles that switch the switched permanent virtual connections, and an operation and maintenance dismantle information is likewise respectively formed. The setup and dismantle information are transmitted to an operation and maintenance terminal of the ATM communication network. Given a transmitted setup information, in this terminal the connection setup is respectively introduced to at least one additional switched permanent virtual connection, via which respectively an additional line bundle is switched. Also, given a transmitted dismantle information, the connection dismantling is introduced to at least one of the additional switched permanent virtual connections.

For the measurement of the traffic volume, according to the present invention the number of narrowband connections currently switched via the respective line bundle is continuously determined by means of the line bundle monitoring routine. This is realized as a program, and is communicated by a message to the external computer-controlled device, in particular a personal computer. In the external computer-controlled device, the exceeding or undershooting of predetermined values by the traffic volume is determined using an evaluation routine, by means of the exceeding or undershooting of predetermined numbers by the communicated numbers. The measurement of the number of narrowband connections guided via the line bundles represents the most advantageous or, respectively, simplest measurement of the traffic volume in the line bundles.

The operation and maintenance terminal of a communication system is advantageously realized by means of an ACL interface that signals switching-oriented events, whereby the traffic volume is indicated in the line bundles by means of event messages. In this ACL interface (application connectivity link), all switching-oriented events that arise in the communication system are signaled to a data processing installation (in particular to a personal computer) by means of event messages. In the personal computer, applications realized as a program, for example, an automatic call distribution or a telephone directory, are realized. In the personal computer, setting information or, respectively, switching instructions, formed in correspondence to the applications, are transmitted to the communication system via the ACL interface, and the indicated instructions are executed. An instruction represents for example "activation of a line bundle allocated to an additional switched permanent virtual connection."

According to a further advantageous development of the inventive method, for the transmission of the event messages and of the operation and maintenance information, the operation and maintenance terminal of the communication system and of the ATM communication network and the computer-controlled device are connected via a local network. Since the operation and maintenance terminals and the terminal of the computer-controlled device are physically realized in the same manner (for example, a V.24 interface), the connection via a local network, advantageously a local bus network, represents the most economical coupling of the individual components.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
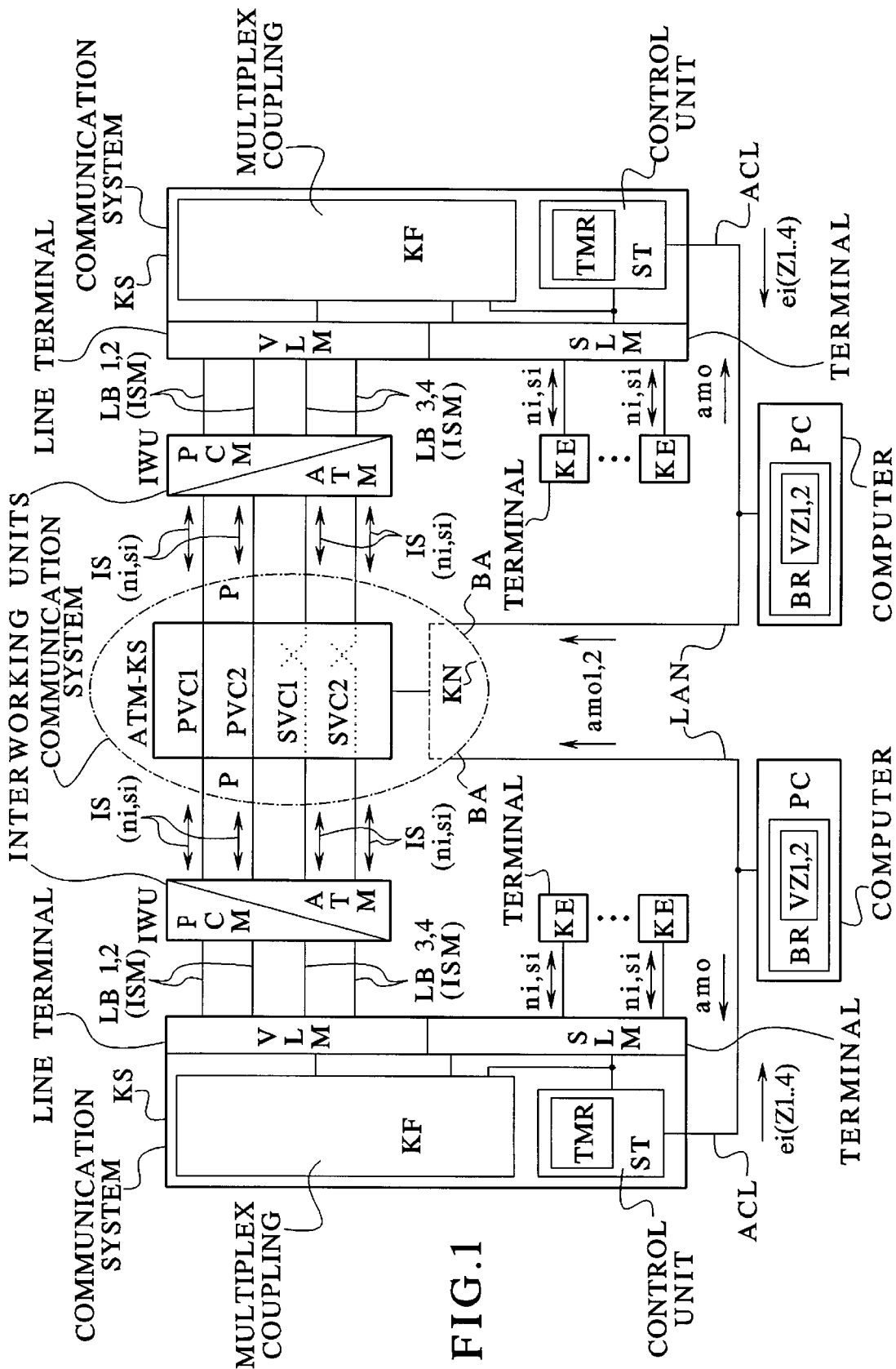
FIG. 1 depicts two communication systems connected via an ATM communication network.

FIG. 1 shows two communication systems KS that switch according to the time division multiplex method, which respectively comprise a time division multiplex coupling field KF, as well as subscriber terminal devices SLM. Communication terminal apparatus KE are connected to the subscriber terminal devices SLM (respectively indicated by two represented communication terminal apparatus KE). Communication terminal apparatus KE may be for example telephone terminal equipment, fax terminal equipment or data transmission devices, whose message information ni are transmitted with a transmission speed of 64 kbit/s, and the allocated signaling information si are transmitted for example with a transmission speed of 16 kbit/s. By means of a control unit ST respectively arranged in the communication system KS, which control unit is connected both with the subscriber terminal devices SLM and with the time division multiplex coupling field KF, connections set up by the communication terminal apparatus KE are respectively switched internally in the respective communication system KS, or are to be switched to the respective other communication system KS on the basis of the transmitted signaling information si. The connections, comprising a message transmission speed of up to 64 kbit/s, are to be reckoned to the narrowband connections. For the "external" switching, in the represented communication systems KS connection line terminal devices VLM are respectively provided. In these connection line terminal devices VLM, the message and signaling information ni, si of narrowband connections provided for the switching to the respective other communication system KS are multiplexed to respectively one information stream ISM representing a line bundle LB1 . . . 4, whereby the transmission speed of an information stream ISM is for example 2048 kbit/s or 1544 kbit/s. Both transmission speeds are standardized, and are provided for the transmission of 30 or, respectively, 24 narrowband connections, including a narrowband connection that transmits the signaling information of all narrowband connections (not shown).

In the exemplary embodiment, four line bundles LB1 . . . 4 from one communication system KS to the other communication system KS are provided. The selection of four line bundles LB1 . . . 4 is shown in the graph represented in FIG. 2.

The graph shows the traffic volume VB (ordinate) during one day T (abscissa). The curve shown, K, represents the traffic volume VB measured over one day T. On the basis of the traffic volume VB shown in FIG. 2, two line bundles LB1, LB2 are required for the represented first and fifth time periods t1, t5 for the narrowband connections to be switched, for the second and third time periods t2, t4 an additional, third line bundle LB3 is required, and for the third time period t3 an additional, fourth line bundle LB4 is required. The lowest traffic volume VB or, respectively, the lowest traffic load VB hereby arises during the first and fifth time periods t1, t5, and the highest traffic load arises in the third time period t3. The time period of the highest traffic load VB is known among those skilled in the art as the peak traffic hour. According to the invention, on the basis of this graph the first and second line bundles LB1, LB2 are allocated to a basic load, and the third and fourth line bundles LB are regarded as additional loads, which are to be switched temporarily via an ATM communication network KN only in the second, third and fourth time periods.

Figure 2:
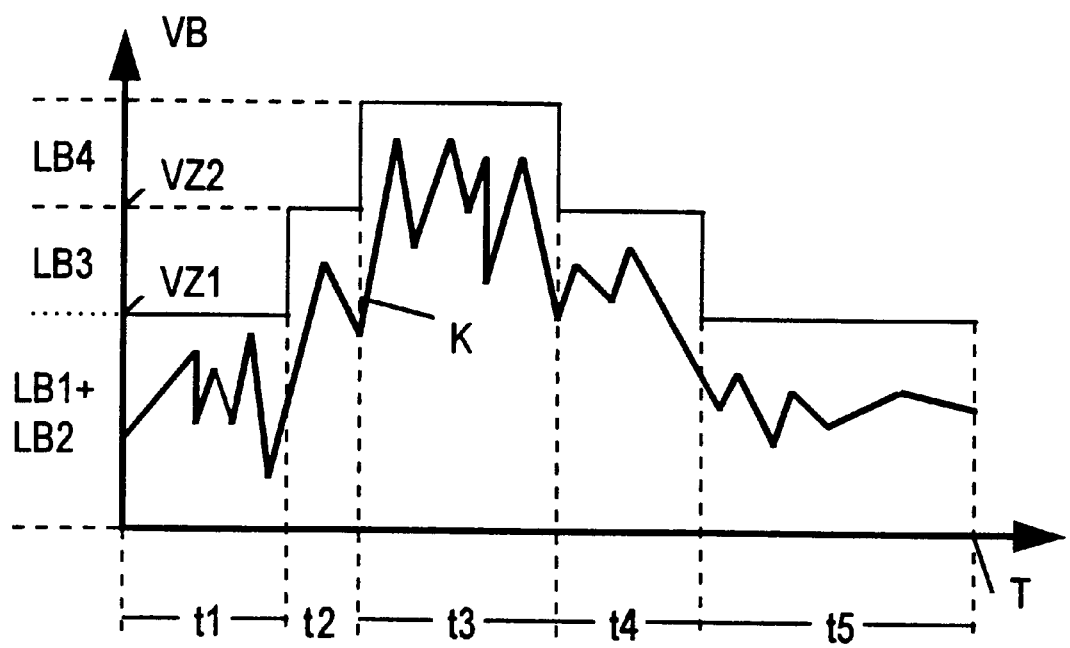
FIG. 2 is a graph diagram showing an example of traffic volume between the communication systems according to FIG. 1.

Based on the measurements of the traffic volume according to FIG. 2, in the exemplary embodiment the message and signaling information ni, si of the first and second line bundle LB1, LB2 are switched via two permanent virtual connections PVC1, 2 of an ATM communication network KN. For this purpose, the two line bundles LB1, LB2 are respectively guided to an interworking unit IWU. In this unit, the message and signaling information ni, si of the multiplex-oriented or, respectively, PCM-multiplex-oriented information streams ISM of the line bundles LB1, LB2 are packed into cells according to ATM, and are respectively combined into a cell-oriented information stream IS and, so far as is necessary, the transmission speed thereof is adapted to that of a terminal of the ATM communication network KN. Let it be assumed for the exemplary embodiment that the cell-oriented information stream IS does not need to be adapted with a transmission speed of two times 2048 kbit/s, since for example an ATM communication system ATM-KS arranged in the ATM communication network provides a terminal with a transmission speed of this sort. Within the ATM communication network KN, the cell-oriented information streams IS are switched or, respectively, transmitted via two permanent virtual connections PVC 1, 2. A permanent virtual connection PVC1, 2 is installed by means of corresponding administrative inputs (not shown) in the relevant ATM communication systems ATM-KS, that is, sets the coupling field devices so that the incoming cell-oriented information stream IS is transmitted according to the required bit rate or, respectively, transmission speed. The transmission via permanent virtual connections PVC1, 2 in an ATM communication network KN is specified in the standardization committee "ATM Forum" in the CES (circuit emulation service) standard. It is disclosed there that the connection can ensue via a physical 155.52 mbit/s terminal, but however the use of this terminal is determined, with regard to the transmission speed, by the required bit rate (two times 2048 kbit/s in the exemplary embodiment). The cells to be switched via the ATM communication network KN (not shown) respectively comprise a cell head into which the ATM communication network-specific address of the origin terminal point and of the target terminal point P are inserted. On the basis of these addresses, the cells of the cell-oriented information stream IS are switched in the communication network KN, whereby in a permanent virtual connection PVC1, 2 incoming cells of a virtual channel are transferred or, respectively, switched directly into the virtual channel determined by the stored virtual channel number.

In addition, the third and fourth line bundles LB3, LB4, provided for the peak traffic loads, are guided to the interworking unit IWU. In this unit, the message and signaling information ni, si are packed into cells corresponding to the first and second line bundle LB1, LB2, or, respectively, are converted into cell-oriented information streams IS and transmitted to the ATM communication network KN.

In addition, the communication systems KS respectively comprise an ACL (application connectivity link) interface ACL, which is respectively connected via a local network LAN with an operation and maintenance terminal BA of the ATM communication network KN and with a personal computer PC. The connected personal computer represents an operation and maintenance device of a communication system KS, or, in particular, a data processing device that realizes additional applications, in which applications that are not provided in the communication system KS, such as automatic call distribution or a telephone directory, are realized by means of corresponding programs. For this purpose, all switching-oriented events of the communication system KS are signaled by means of event messages ei, and, conversely, operation and maintenance or switching-oriented instructions amo, which are called up or, respectively, formed in the personal computer corresponding to the applications, are transmitted to the communication system KS, in which the switching-oriented or, respectively, operation and maintenance actions indicated in the instructions are executed.

With respect to the inventive method, a line bundle monitor routine TMR is provided in the program-controlled control units ST of the communication systems KS, which units are realized by microprocessors, by means of which routine the line bundles LB1 . . . 4 are monitored and the traffic volume VB is measured. The traffic volume VB is measured continuously (that is, in predetermined time intervals) by the number Z1 . . . 4 of the active narrowband connections (that is, occupied narrowband connections) in the respective line bundles LB1 . . . 4. The measured numbers Z1 . . . 4 are inserted into event messages ei (Z1 . . . 4), and, using the control unit ST, are transmitted via the ACL interface ACL to an evaluation routine BR (realized as a program) in the personal computer PC. The transmitted, measured numbers Z1 . . . 4 are stored and evaluated using the evaluation routine BR. For the evaluation, first the measured traffic volume VB of the line bundles LB1, 2, switched via the two permanent virtual connections PVC1, 2, are used. If the number Z1, Z2 of the active narrowband connections in these line bundles LB1, LB2 exceeds, a predetermined time span (for example, 10 minutes), a predetermined first number VZ1 stored in a table TB, which represents, for example, an 80% occupation of the two line bundles LB1, LB2, an operation and maintenance instruction amo1 is formed, by means of which a connection setup for a switched permanent connection SPVC1 is introduced in the communication system KS for the switching of the third line bundle LB3. Analogously to the previously described way of proceeding, upon the exceeding of the measured number (Z1+Z2+Z3) over a second predetermined number VZ2, an operation and maintenance instruction amo1 is formed, by means of which the connection setup of a second switched permanent virtual connection SPVC2, via which the fourth line bundle LB4 is switched, is introduced in the ATM communication system ATM-KS. FIG. 2 represents the connection of the third and fourth line bundle LB3, LB4 by the indicated numbers VZ1, VZ2 in the ordinate. This means that the traffic volume VB in the first and fifth time period t2, t5 is managed by the two line bundles LB1, LB2 switched via the permanent virtual connections PVC1, PVC2, and in the second and fourth time period t2, t4 is additionally managed by the third line bundle LB3 switched via the first switched permanent virtual connection SPVC1, and in the fourth time period t4 is additionally managed by the fourth line bundle LB4 switched via the second switched permanent virtual connection SPVC2, whereby the two switched permanent virtual connections SPVC1, SPVC2 remain set up in the respective time periods t2, t3, t4.

The set-up switched permanent virtual connections SPVC1, SPVC2 are dismantled again in dependence on the measured traffic volume VB. This means that the traffic volume VB, that is, the number Z1, Z2, Z3, Z4 of the active narrowband connection, has fallen below a predetermined number VZ1, VZ2, at which it is respectively ensured that no further traffic volume VB arises in the line bundles LB3, LB4 to be dismantled. Given three switching line bundles LB1, LB2, LB3 and respectively 30 narrowband connections per line bundle LB1, LB2, LB3, LB4, the first permanent virtual connection SPVC1 switching the third line bundle LB3 is dismantled, if the measured number Z1, Z2, Z3 of active narrowband connections falls below the predetermined first number VZ1 of 80% of 60 active narrowband connections, that is, 48. It is hereby to be ensured by means of the communication system KS that these 48 narrowband connections are switched via the first and second line bundle LB1, LB2. If warranted, individual narrowband connections are to be rearranged. In order to better exploit the switching-oriented resources of the ATM communication network KN, the occupation of the line bundles LB1, LB2, LB3, LB4 with narrowband connections is to be carried out such that narrowband connections are first switched the line bundles LB1, LB2 that are switched via the permanent virtual connections PVC1, PVC2, and additional narrowband connections are switched via the line bundles LB3, LB4, which are respectively switched via the switched permanent virtual connections SPVC1, SPVC2. As a consequence, the narrowband connections are to be switched with priority via narrowband connections of the first two line bundles LB1, LB2 that are free or are being released. The switched permanent virtual connections SPVC1, SPVC2 are dismantled by means of an operation and maintenance instruction amo2, formed correspondingly in the evaluation routine BR and transmitted to the ATM communication system ATM-KS.

Two line bundles LB3, LB4, connected via permanent virtual connections PVC1, PVC2, can be replaced by switched permanent virtual connection SPVC1, SPVC2, by means of the temporary connection of the third and fourth line bundle LB3, LB4 via switched permanent virtual connections SVPC2, SVPC2 in the time periods t2 . . . t4 with a higher traffic load VB. This results in a a considerable reduction in fees.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for switching of time division multiplex-oriented line bundles between time division multiplex communication systems, comprising the steps of:
    converting information streams representing time division multiplex-oriented line bundles, which streams are formed by multiplexed message and signaling information of narrowband connections, into a cell-oriented information stream conforming to ATM (Asynchronous Transfer Mode) and transmitting the information stream to an ATM communication network:
    switching the signaling and message information of the line bundles transparently via permanent virtual connections and via switched permanent virtual connections:
    installing a predetermined number of permanent virtual connections via the ATM communication network between respective communication systems for switching a predetermined number of line bundles:
    measuring traffic volume in the predetermined number of line bundles, and, dependent on measurement results thereof, setting up switched permanent virtual connections, which switch additional line bundles, via the ATM communication network for switching of information streams:
    measuring traffic volume in the set-up switched permanent virtual connections, and dismantling the set-up permanent virtual connections in dependence on the measurement results;
    continuously measuring in the communication systems the traffic volume in the line bundles using a line bundle monitoring routine, and the measurement results being transmitted to an external computer-controlled device via an operation and maintenance terminal, in the computer controlled device, using an evaluation routine;
    determining exceeding of predetermined values by the traffic volume, and respectively forming switching-oriented setup information;
    determining undershooting of predetermined values of the traffic volume in the line bundles switched via switched permanent virtual connections, and respectively forming operation and maintenance dismantle information, and transmitting the dismantle information to an operation and maintenance terminal of the ATM communication network;
    wherein in the ATM communication network, given a transmitted setup information, the connection setup of at least one additional switched permanent virtual connection is respectively introduced, via which connection a further line bundle is respectively switched, and, given a transmitted dismantle information, the connection dismantling of at least one further switched permanent virtual connection is introduced, via which a further line bundle is respectively switched.

2. The method according to claim 1, wherein in the communication systems, the message and signaling information of narrowband connections to be switched between communication systems are first allocated to the line bundles that are switched via the installed permanent virtual connections, and message and signaling information of narrowband connections that are additionally to be switched are allocated to the line bundles that are switched via set-up switched permanent virtual connections.

3. The method according to claim 1, wherein in the communication system, for the measurement of the traffic volume using a line bundle monitoring routine, which is realized as a program, a number of narrowband connections currently switched via a respective line bundle is continuously determined, and is communicated by a message of the external computer-controlled device, and wherein in the external computer-controlled device, using an evaluation routine, exceeding or undershooting of predetermined values of the traffic volume is determined by exceeding or undershooting of predetermined numbers by the communicated numbers.

4. The method according to claim 1, wherein the operation and maintenance terminal of a communication system is realized by an ACL interface that signals switching-oriented events, the traffic volume in the line bundles in the communication system being measured using a line bundle monitor routine, and indicated by event messages.

5. The method according to claim 4, wherein for transmission of the event messages and operation and maintenance information, the operation and maintenance terminal of the communication system and of the ATM communication network and the computer-controlled device are connected through a local network.

6. The method according to claim 1, wherein the evaluation routine is realized as a program in a personal computer that realizes the computer-controlled device.

7. The method according to claim 1, wherein traffic volume representing a basic load is respectively determined by a number of line bundles to be switched between two time division multiplex-designed communication systems at time periods of low traffic, and wherein line bundles are switched via permanent virtual connections of the ATM communication network.

8. The method according to claim 1, wherein traffic volume exceeding a basic load is respectively determined by an additional number of line bundles to be switched between two time division multiplex-designed communication systems in time periods of heavy traffic, and wherein said line bundles are switched via set-up, switched permanent virtual connections of the ATM communication network.

9. The method according to claim 1, wherein using an interworking unit, message and signaling information of the line bundles for the switching via permanent or switched permanent virtual connections are converted into cell-oriented information streams in conformance with ATM, and, conversely, the cell-oriented information streams of the permanent virtual connections or switched permanent virtual connections are unpacked, and the time division multiplex-oriented message and signaling information are allocated to the respective line bundles.

10. The method according to claim 9, wherein the cell-oriented information streams of several line bundles are combined and switched via permanent or switched permanent virtual connections of the ATM communication network.

11. The method according to claim 9, wherein the interworking units are realized in ATM communication networks or between the time division multiplex communication systems and the ATM communication network.

12. The method according to claim 1, wherein the line bundles have a standardized transmission speed of 2048 kbit/s or 1544 kbit/s.

13. The method according to claim 1, wherein a scope of the cell-oriented information streams to be switched is indicated to the ATM communication networks, in the context of a connection setup of a permanent or switched permanent virtual connection, in an operation and maintenance instruction by bit rates.

14. The method according to claim 1, wherein the switched permanent virtual connections to the respective further communication system are respectively set up using a predetermined address specific to the ATM communication network.

15. A method for switching of time division multiplex-oriented line bundles between time division multiplex communication systems, comprising the steps of:

converting information streams representing time division multiplex-oriented line bundles, which streams are formed by multiplexed message and signaling information of narrowband connections, into a cell-oriented information stream conforming to ATM (Asynchronous Transfer Mode) and transmitting the information stream to an ATM communication network;

switching the signaling and message information of the line bundles transparently via permanent virtual connections and via switched permanent virtual connections;

installing a predetermined number of permanent virtual connections via the ATM communication network between respective communication systems for switching a predetermined number of line bundles;

continuously measuring the traffic volume in the line bundles using a line bundle monitoring routine, and transmitting the measurement results to an external computer-controlled device via an operation and maintenance terminal, in the computer controlled device, using an evaluation routine;

determining exceeding of predetermined values by the traffic volume, and respectively forming switching-oriented setup information; and determining undershooting of predetermined values of the traffic volume in the line bundles switched via switched permanent virtual connections, and respectively forming operation and maintenance dismantle information, and transmitting the dismantle information to an operation and maintenance terminal of the ATM communication network;

wherein in the ATM communication network, given a transmitted setup information, the connection setup of at least one additional switched permanent virtual connection is respectively introduced, via which connection a further line bundle is respectively switched, and, given a transmitted dismantle information, the connection dismantling of at least one further switched permanent virtual connection is introduced, via which a further line bundle is respectively switched.

16. The method according to claim 15, wherein in the communication system, for the measurement of the traffic volume using a line bundle monitoring routine, which is realized as a program, a number of narrowband connections currently switched via a respective line bundle is continuously determined, and is communicated by a message of the external computer-controlled device, and wherein in the external computer-controlled device, using an evaluation routine, exceeding or undershooting of predetermined values of the traffic volume is determined by exceeding or undershooting of predetermined numbers by the communicated numbers.

17. The method according to claim 15, wherein the operation and maintenance terminal of a communication system is realized by an ACL interface that signals switching-oriented events, the traffic volume in the line bundles in the communication system being measured using a line bundle monitor routine, and indicated by event messages.

18. The method according to claim 17, wherein for transmission of the event messages and operation and maintenance information, the operation and maintenance terminal of the communication system and of the ATM communication network and the computer-controlled device are connected through a local network.

19. The method according to claim 15, wherein the evaluation routine is realized as a program in a personal computer that realizes the computer-controlled device.

* * * * *